No. 627,813. Patented June 27, 1899.
T. C. WALES, Jr.
TELEPHONE CIRCUIT AND SWITCHING APPARATUS.
(Application filed Mar. 14, 1899.)
(No Model.)
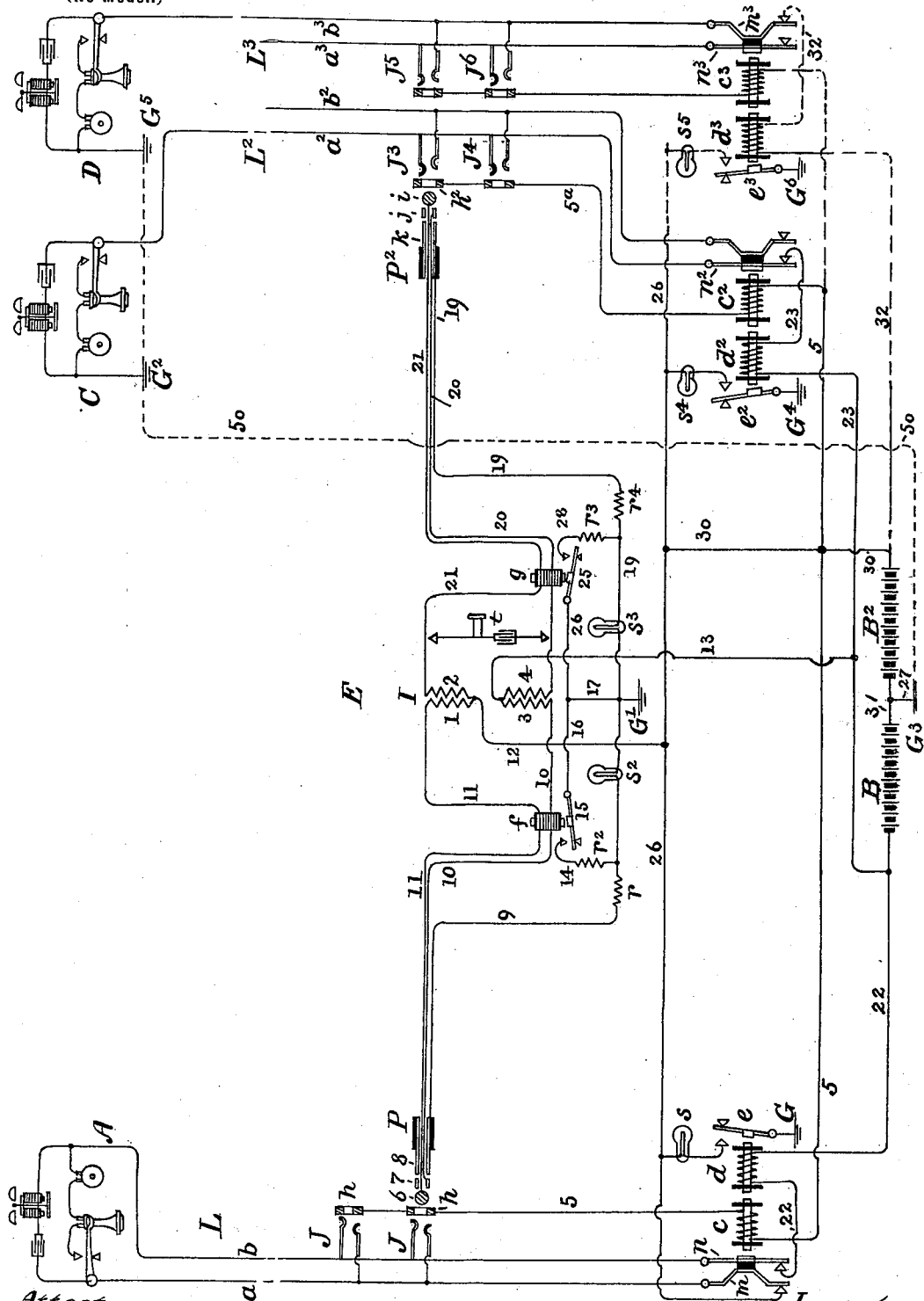
Attest.
Joseph A. Gately
Geo. Willis Pierce
Inventor
Thomas C. Wales Jr.

UNITED STATES PATENT OFFICE.

THOMAS C. WALES, JR., OF NEWTON, MASSACHUSETTS, ASSIGNOR TO THE AMERICAN BELL TELEPHONE COMPANY, OF BOSTON, MASSACHUSETTS.

TELEPHONE-CIRCUIT AND SWITCHING APPARATUS.

SPECIFICATION forming part of Letters Patent No. 627,813, dated June 27, 1899.

Application filed March 14, 1899. Serial No. 708,996. (No model.)

*To all whom it may concern:*

Be it known that I, THOMAS C. WALES, Jr., residing at Newton, in the county of Middlesex and State of Massachusetts, have invented certain Improvements in Telephone Circuits and Switching Apparatus, of which the following is a specification.

The more recently devised switching apparatus at telephone central offices or exchanges, usually termed the "switchboard," has associated therewith a source of energy by means of which the signaling between the subscribers at the connected substations and the switchboard operators is effected and from which current is supplied to substation-circuits when switched together for conversational purposes. The substation-circuits connected to such a switchboard are often of a mixed character—*i. e.*, part of them are metallic circuits and part are grounded circuits, and with such a combination it becomes desirable in many cases to increase the supply of current or the electromotive force to the transmitters operated on the metallic circuits, thereby increasing the loudness of telephone transmission, without at the same time increasing the supply or electromotive force to the transmitters on the grounded lines.

The object of the present invention is to provide means whereby a comparatively high electromotive force is made use of for the metallic circuits and a comparatively low electromotive force is made available for grounded lines.

The invention is preferably combined with that form of substation-circuits known in the art as "relay-circuits," in which when the telephone is removed from its movable switch-support at a substation the circuit is closed automatically by the said support and a line-lamp signal is lighted at the switchboard-terminal, and when the operator's answering-plug is inserted in the answering-socket of the circuit a relay is energized and operated to open the conductors of said circuit and cause the said signal to be extinguished.

In carrying out the invention the conductors of the metallic substation-circuits are connected to the opposite poles of the common source of energy, preferably a battery, in series therewith, through the two armatures of the cut-off relay, while the grounded substation-circuits are divided into two divisions, and the battery is separated into two connected portions and has a branch to ground between the two portions, and the single metallic conductor of each of the circuits of one division is connected to that conductor back of the switchboard which extends to the tip springs of all the switch-sockets and then by one armature of the cut-off relay to one pole of the battery and ground, while the single metallic conductor of each of the circuits of the other division is connected to the second conductor, which extends to the sleeve contact-springs of the said switch-sockets, and then by the second armature of the cut-off relay to the opposite pole of the second portion of the battery and to ground. The operator's cord-circuits are provided with repeating retardation-coils divided into four windings, two of which are in series with each other in the respective cord conductors, and from the inner ends of each pair of said windings there extends a conductor to the respective poles of the battery, and the tip and front sleeve conductors of each plug are both wound upon and constitute the helices of the relays which control the supervisory lamp-signals in each plug-circuit. The object of this arrangement of windings is to provide means for the operation of the supervisory signals over either of the two divisions of substation-circuits, as one-half of the said lines are supplied with current over the tip side of the cord and the current from the other half flows over the sleeve side of the cord, and as the same cord-circuit is to be used with lines of both descriptions current over either the tip conductor or the sleeve conductor will operate the relay.

The invention therefore consists in the combination of a telephone switching system composed of a switchboard provided with a common source of energy for signaling from the substations to the central station and for conversation circuits and purposes, with metallic and grounded or single-line substation-circuits, the former circuits adapted to receive the whole current from the said source of energy in series therewith and the latter circuits adapted to receive current from one grounded portion of said source of energy, as follows: One division of said grounded circuits to receive the said current over one grounded portion and the other division to receive the said current over the opposite grounded portion.

The invention also refers to the substitution for a common ground return of a metallic return for a plurality of substation-circuits in localities where the potential of the earth is so disturbed as to render the operation of grounded lines difficult. By connecting one-half of the grounded lines to either terminal of the battery the middle point of which is connected to the common return-wires, there results a three-wire system by which current in the common return-wires is greatly reduced, and consequently a comparatively small conductor can be used for this purpose.

The invention consists also in the general arrangement of circuits and operation, as will be more fully disclosed.

The drawing which illustrates the invention is a diagram showing a metallic substation-circuit L and two grounded or single-wire substation-circuits $L^2$ and $L^3$ and a central-station switching apparatus E, at which are located the terminals of the said substation-circuits.

The apparatus at the substations is of the usual description employed in common energy relay-circuits and consists of a condenser and high-resistance bell in the normal circuit and a receiving and transmitting telephone in a circuit which is open when the former telephone is upon its hook-switch, but is adapted to be closed when the said telephone is removed from the hook-switch and in shunt with the condenser and bell.

The conductors $a$ and $b$ of the circuit L extend to the central station and are provided with open terminal switch-sockets J J at the several switchboard-sections and terminate with the respective armatures $m$ and $n$ of the cut-off relay $c$. The former armature is connected by the conductors 26 and 30 with one pole of the battery B $B^2$, while the second armature $n$ is connected by conductor 22 and helices of line-signal relay $d$ to the opposite pole of the battery. The test-rings $h$ of the switch-sockets J are connected by wire 5 to the helices of the cut-off relay $c$ and by wires 5 and 30 to the right-hand portion $B^2$ of the battery to ground $G^3$.

The line lamp-signal $s$ is located in a branch from the conductor 26, which is adapted to be closed to ground G when the armature $e$ of relay $d$ is attracted to its front contact.

From the previous description it will be seen that when the telephone is removed at the substation A and the shunt-circuit closed by the hook-switch, a circuit is formed from the battery, via conductor 22, line-signal relay $d$, armature $n$, conductor $b$, bell and condenser, conductor $a$, armature $m$, conductors 26 and 30 to the opposite pole of the battery and the armature $e$ is attracted to its front contact, and current flows from ground G, armature $e$, lamp-signal $s$, conductors 26 and 30, and portion $B^2$ of battery to ground $G^3$.

The substation-circuits $L^2$ and $L^3$ are grounded or single-wire circuits, and to carry out the invention—i. e., of supplying but a portion of the battery to any one of such circuits—the battery has been divided, as shown, into two portions B and $B^2$, connected in series by the wire 31, with a grounded wire 27 between them, and to provide for an equal distribution of the said grounded circuits to the battery, so that a substantially equal amount of current shall be supplied by both portions thereof, it is arranged that one-half of the grounded circuits shall be connected with the portion B and the remainder with the portion $B^2$. The circuit $L^2$ extends, by conductor $a^2$, from ground $G^2$ at the substation C to the central station and connects with the sleeve or long-spring terminals of the multiplied sockets $J^3$ and $J^4$ and to armature $n^2$ of cut-off relay $c^2$ and by wire 23, including helices of line lamp-signal $d^2$, to the portion B of the battery and to ground $G^3$, and when the telephone at the substation C is removed current from battery B circulates over the circuit described from ground $G^3$ to ground $G^2$, and the armature $e^2$ is attracted to its front contact, whereupon current circulates from ground $G^4$, armature $e^2$, line-lamp $s^4$, conductors 26 and 30, battery $B^2$, and ground $G^3$, and the circuit $L^3$ extends from ground $G^5$ at substation D by conductor $b^3$ to the central station and connects with the tip or short-spring terminals of the multiplied sockets $J^5$ and $J^6$ to the armature $m^3$ of the cut-off relay $c^3$, conductor 32, including helices of line-signal relay $d^3$, to the portion $B^2$ of the battery and ground $G^3$, and current from battery $B^2$ circulates over the circuit, and when the telephone at the substation D is removed and the armature $e^3$ is attracted to its front contact current circulates from ground $G^6$, armature $e^3$, lamp-signal $s^5$, wires 26 and 30, battery $B^2$, and ground $G^3$.

The cord-circuits, by means of which the substation-circuits, whether metallic or grounded, are connected together, have both sides symmetrical and are divided by the repeating-coil I, which has two windings 1 and 2 in series with each other and connected to the tips 6 and $i$ of the plugs P and $P^2$ by the respective conductors 11 and 21 with a branch conductor 12 from their inner ends to one pole of the battery and also two windings 3 and 4 in series with each other and connected to the forward sleeves 7 and $j$ of the respective plugs by the conductors 10 and 20 with a branch conductor 13 to the opposite pole of the battery. The tip and sleeve conductors are both wound upon and constitute the two windings in the same direction of the supervisory signal-relays $f$ and $g$. The rear sleeves 8 and $k$ of the two plugs are connected to ground G' by the respective conductors 9 and 19, which include the resistances $r$ $r^4$ and supervisory lamp-signals $s^2$ and $s^3$. Means are provided for establishing a shunt about the signal $s^2$, consisting of the armature 15, adapted to close the wire 14 with resistance $r^2$ with wires 16 and 17 and for establishing a similar shunt around signal $s^3$, consisting of armature 25, adapted to close the wire 28 and resistance $r^3$ to wires 26 and 17.

When a line-signal $s$ has been lighted, as hereinbefore described, the operator inserts plug P into the answering-socket J, and the tip 6 thereof makes contact with the short spring in the socket and the forward sleeve 7 with the long spring, while the rear sleeve 8 makes contact with the test-ring $h$ and current flows from ground $G^3$, portion $B^2$ of battery, wires 30 and 5, ring $h$, sleeve 8, conductor 9 to ground $G'$. The cut-off relay $c$ operates to attract the armatures $m$ and $n$, and lamp $s$ is extinguished. At the same time current flows from the whole battery, via conductors 23 and 13, winding 3 of coil I, conductors 10 and $b$, to the substation, returning by the conductors $a$ and 11, winding 1 of coil I, conductors 12 and 26 and 30 to the battery. The relay $f$ is energized and attracts the armature 15 to its contact and shunts the signal $s^2$. The operator can now switch in the telephone $t$ and take the order from the substation. If a second metallic circuit is to be connected with circuit L, the insertion of plug $P^2$ into a socket of such circuit will cause current to circulate thereover from the whole battery in the same manner as described of the insertion of plug P into circuit L. If, however, the called-for substation be one having a single wire—say the substation C—the calling-plug $P^2$ is inserted into the socket $J^3$ and the tip $i$ makes contact with the short spring, and as the spring is open the tip conductor 21 is idle. The forward sleeve $j$ makes contact with the long spring of the socket and current will circulate from ground $G^3$, portion of battery B, conductors 23 and 13 to winding 4 of coil I, conductors 20 and $a^2$ to ground $G^2$. The substation of the second line can now be signaled in a well-known manner by operating a call-key at the central station, which connects an alternating-current generator to the said line—as shown, for example, in Patent No. 597,787, dated January 25, 1898, to Charles E. Scribner—and upon removal of the substation-telephone its switch-hook shunts the bell and condenser. Conversation can now be carried on between the two connected substations. If the called-for substation should be the one represented by D, the calling-plug $P^2$ will be inserted in the line-socket $J^5$ of the circuit $L^3$. In this case the tip of the plug will come in contact with the short spring of the socket and a circuit will be found from ground $G^5$, conductors $b^3$ and 21, winding 2 of coil I, conductors 12, 26, and 30, portion $B^2$ of battery, and ground, and when the telephone at the substation D is removed from its hook-switch the latter closes the circuit through the telephones and shunts the condenser and bell. It will be seen that in this case cord conductor 20 will be idle as the forward sleeve $j$ makes contact with the sleeve-spring of the socket, which is open. At the termination of conversation when the telephone at substation A is hung upon its hook-switch the latter opens the described conversation-circuit and as current ceases to flow therein the relay $f$ fails to attract the armature 15, which falls away and opens the shunt around the supervisory lamp-signal $s^2$, and as current flows from ground $G'$, conductor 9, lamp-signal $s^2$, conductor 5, relay $c$, conductor 30 to battery $B^2$ and ground $G^3$ the lamp-signal $s^2$ is lighted, and when the plug P is withdrawn from the socket $J^2$ the lamp is extinguished, and when the circuit $L^2$ or $L^3$ is opened by the replacement of the telephone upon its hook-switch at C or D, as the case may be, the armature of relay $g$ falls away, opening the shunt around the supervisory lamp-signal $s^3$, and the current flowing from ground $G^3$, portion $B^2$ of battery, conductors 30 and 5, relays $c^2$, (or $c^3$,) conductors $5^a$ and 19, lamp-signal $s^3$ to ground causes the lamp-signal to glow to indicate a disconnection.

In localities where the potential of the earth is so disturbed as to render the operation of grounded lines difficult recourse is had to a common return-wire for a plurality of substation-circuits. With telephone systems of the common energy type where many substation-circuits are simultaneously in use the common return-conductor has to carry considerable current. Consequently unless the resistance of the common return is very low the fall of potential therein will be so great as to seriously reduce the supply of current and therefore the volume of telephonic transmission.

By connecting one-half of the grounded circuits similar to substation-circuit $L^2$ with portion B of the battery and the remainder of said circuits similar to substation-circuit $L^3$ with the $B^2$ portion of the battery, both of which portions are connected to the common return wire or conductor 50, there results a three-wire system by which the current in the said conductor is greatly reduced, and consequently a comparatively small conductor can be used for this purpose.

I claim as my invention—

1. The combination in a telephone switching system, of a series of relay substation-circuits, a series of linking cord-circuits, a centralized common source of energy in two serially-connected portions, and a common return wire or conductor connected by one end between said portions; the said substation-circuits being in two divisions, each circuit consisting of a single conducting-wire connected at the substations to the said common conductor, and provided with open terminal sockets at the switchboard-sections, and extending through the relay-switch, one division thereof being connected to one portion of the said source of energy, and the second division connected to the second portion thereof, as set forth.

2. The combination in a telephone switching system, of a series of metallic relay substation-circuits a series of single-conductor relay-circuits, a series of linking cord-circuits, a centralized common source of energy in two serially-connected portions, and a common return wire or conductor connected by one end between said portions; the said metallic circuits provided with open terminal sockets at the switchboard-sections and extending through the relay-switch to the opposite poles of the whole source of energy; the said single-conductor circuits being in two divisions, each conductor of which is connected at the substation to the said common conductor, and provided with open terminal sockets at the switchboard-sections and extending through the relay-switch, one division thereof being connected to one portion of the said source of energy, and the second division connected to the second portion thereof, as set forth.

3. The combination in a telephone switching system, of a metallic substation-circuit, and a single-wire substation-circuit, and means at the central station for supplying current to the said circuits consisting of a common source of energy in two serially-connected portions with an intermediate ground branch, and means for connecting the terminals of the substation-circuits together consisting of a cord-circuit provided with a repeating-coil divided into four windings, two of which are in series with each other in the respective cord conductors, and from the inner ends of each pair of said windings extends a conductor to the respective poles of a source of energy; whereby when the substation-circuits are connected together by the cord-circuit, current will flow from the whole source of energy, over the two conductors of the metallic circuit, and current will also flow from one portion of the source of energy over the single wire and ground of the second circuit, as set forth.

4. The combination in a telephone switching system, of a metallic substation-circuit, and a single-wire substation-circuit, both circuits being normally closed at the substation through a high-resistance call-bell; the metallic circuit normally closed at the central station through a relay and a common source of energy in two serially-connected portions with an intermediate ground branch, and the single-wire circuit normally closed through a relay and ground through one portion of said source of energy; with a line lamp-signal for each circuit in a normally open extension from one portion of said source of energy adapted to be closed to earth by the grounded armatures of the relays; whereby when the telephone at either substation is removed from its hook-switch current will flow through the line lamp-signal of that circuit and cause it to glow, as set forth.

5. The combination in a telephone switching system, of two single-wire or grounded substation-circuits, the wire of one circuit connected to the tip or short springs of its switching-sockets, and the wire of the other circuit connected to the sleeve or long springs of its switching-sockets, and means at the central station for supplying current to the said circuits, consisting of a common source of energy in two serially-connected portions with an intermediate ground branch; and means for connecting the terminals of the substation-circuits together, consisting of a cord-circuit provided with a repeating-coil divided into four windings, two of which are in series with each other, in the respective cord conductors, from the inner ends of each pair of said windings extends a conductor to the respective poles of the source of energy; whereby when the substation-circuits are connected together by the cord-circuit, current will flow from one portion of said source of energy over the single wire and ground of one substation-circuit, while current will flow from the second portion of the source of energy over the single wire and ground of the other substation-circuit, as set forth.

6. The combination in a telephone switching system, of a metallic substation-circuit and a single-wire substation-circuit, each normally closed at the substations by a high-resistance call-bell adapted to be shunted by the automatic action of a telephone hook-switch, with terminal switch-sockets at the central station; and means for connecting the terminals of the said circuits together consisting of a cord-circuit with connecting-plugs having three contact-surfaces, the tip and forward sleeve conductors of each plug wound upon a supervisory signal-relay and extending to separate windings of a repeating-coil which are joined in pairs at their inner ends and connected with the respective poles of a source of energy in two serially-connected portions with a ground branch from its center; the rear-sleeve contact of each plug being connected through a supervisory lamp-signal adapted to be shunted by the armature of said relay; whereby when the said call-bells are shunted by the hook-switches and the line-terminals are connected together by the cord-circuit, current flows from the whole of said source of energy over the metallic substation-circuit and current flows from a portion of said source of energy over the single wire and ground of the grounded substation-circuit, causing the said armatures to close the shunt around the said lamp-signals; and when the said call-bell shunt is opened by the hook-switch the shunt-circuits around the lamps are also opened and current flows from a portion of the source of energy through the local lamp-signal circuits, and causes the lamp-signals to glow, as set forth.

In testimony whereof I have signed my name to this specification, in the presence of two subscribing witnesses, this 3d day of March, 1899.

THOMAS C. WALES, JR.

Witnesses:
GEO. WILLIS PIERCE,
JOSEPH A. GATELY.